July 10, 1956 — D. E. ATKINSON — 2,754,384
BACK-UP WARNING DEVICE
Filed May 18, 1953
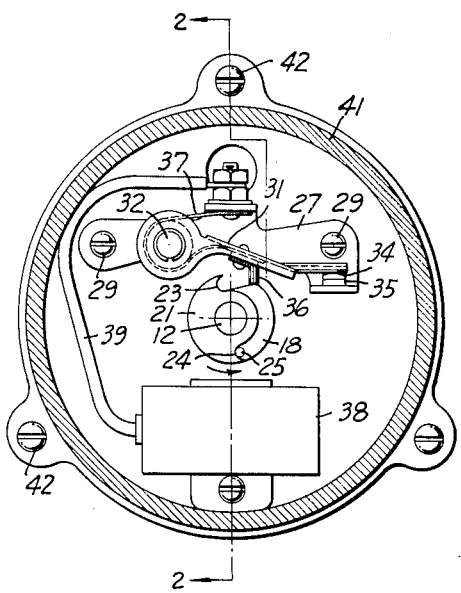
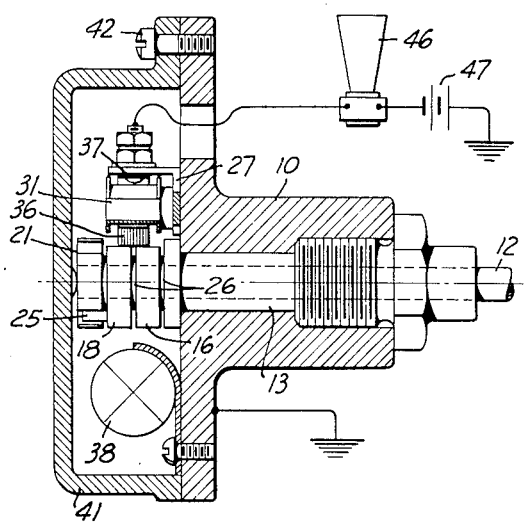
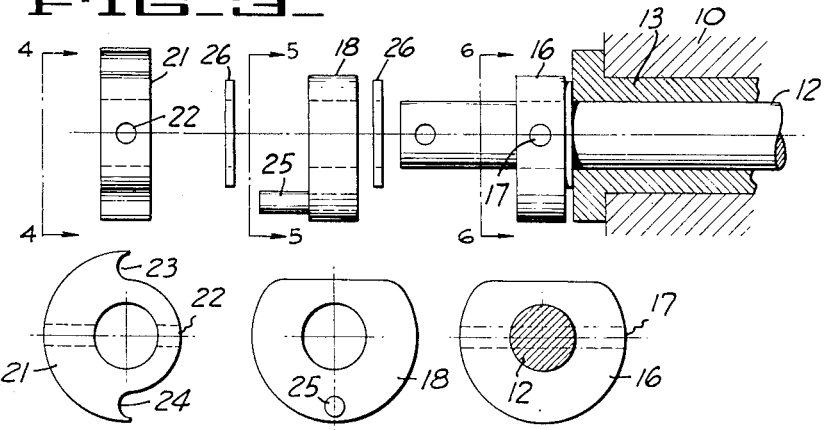
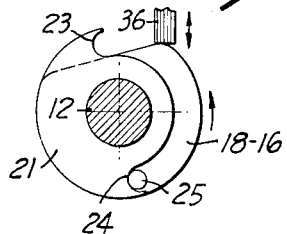
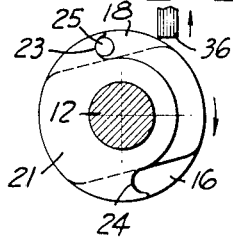
INVENTOR
Duane E. Atkinson
BY
ATTORNEYS

United States Patent Office 2,754,384
Patented July 10, 1956

2,754,384

BACK-UP WARNING DEVICE

Duane E. Atkinson, Menlo Park, Calif.

Application May 18, 1953, Serial No. 355,838

4 Claims. (Cl. 200—61.39)

This invention relates generally to devices for actuating warning signals and alarms, and more particularly to devices for actuating back-up warning alarms for trucks, tractors and like automotive vehicles.

In many instances it is desirable to provide motor vehicles with signal or alarm means which will provide a characteristic warning when the vehicle moves backwardly. For example, on dam, highway or like projects it is important to use such an arrangement on trucks, tractors, earth movers or like vehicles to minimize collision and personnel hazards. Electrical alarm systems for this purpose have been used in the past, but they have lacked desired simplicity and reliability of operation.

In general it is an object of the present invention to provide an improved device of the above character which will operate a warning signal or alarm intermittently as a vehicle moves backwardly.

Another object of this invention is to provide an improved device of this kind which will operate when the vehicle is coasting backwardly, even though the engine may be dead.

A further object of the invention is to provide improved electrical contactor means which can be installed on an automotive vehicle and which serves to control a signal lamp, horn or other back-up warning means.

Other objects and advantages of this invention will appear from the following description taken in conjunction with the accompanying drawings.

Referring to the drawing:

Figure 1 is a side view of my device.

Figure 2 is a cross-sectional view taken along the line 2—2 of Figure 1.

Figure 3 is an exploded view of the shaft and cam assembly.

Figure 4 is a view taken in the direction of the arrows 4—4 of Figure 3.

Figure 5 is a view of the cam in the direction of the arrows 5—5 of Figure 3.

Figure 6 is a cross-sectional view taken along the line 6—6 of Figure 3.

Figure 7 is a view of the cam assembly in the position it takes when a vehicle is moving backwardly.

Figure 8 is a view of the cam assembly when the vehicle is moving in a forward direction.

In general the present invention consists of electrical contacts which are connected to control an alarm circuit, together with a special cam assembly which is connected with a rotating member of the vehicle. The cam assembly operates the contacts to make and break the circuit when the vehicle is moving backwardly and to retain an open circuit when moving forwardly.

The embodiment of the device shown in the drawing consists of a body 10 which forms a mounting for the breaker point assembly and the cam assembly. A shaft 12 extends through the body and is suitably journaled as by means of the bushing 13.

The shaft 12 is connected to any part of the vehicle which necessarily rotates in one direction when the vehicle moves backwardly and in the opposite direction when the vehicle moves forwardly. For example, it may be connected by a flexible shaft or like means to the wheel side of the clutch mechanism, or to the transmission, in much the same way as a speedometer is connected, as long as the shaft 12 is made to rotate in one direction if the vehicle is moving forwardly, and in the opposite direction if the vehicle is moving backwardly.

The cam assembly consists of a cam 16 rigidly attached to shaft 12 by suitable means such as the pin 17. A second cam 18 is rotatably (i. e. loosely) mounted on shaft 12. Lost motion means connects the shaft 12 with the cam 18, whereby angular movement between these parts is limited. Thus an abutment member 21, in the form of a collar, is rigidly attached to the shaft 12 by suitable means such as a pin 22. This member is formed to provide a pair of limiting shoulders 23 and 24 which are spaced apart by a predetermined angular distance, as for example 180°. The shoulders 23 and 24 are adapted to engage the projecting pin 25 which is carried by the cam 18. Suitable spacing washers 26 may be provided between cams 16 and 18 and between cam 18 and abutment member 21.

Cams 16 and 18 have a configuration suitable for the breaker point assembly and alarm circuit used. In practice I have found it satisfactory to form both cams with a cylindrical peripheral surface extending through approximately 270° and a flat surface forming a valley extending through the remaining 90°.

Any suitable breaker point assembly may be used with the cam assembly hereinbefore described. One assembly found to be satisfactory consists of a bracket 27 which is attached to the body 10 by suitable means such as screws 29. A contactor arm 31 is pivotally mounted on bracket 27 by pin 32. A movable insulated contact 34 on the free end of arm 31 is adapted to engage a stationary contact 35. A rubbing block 36 of insulating material is attached to the contactor arm 31 in such a manner that it engages the peripheral surfaces of both cams 16 and 18. Contactor arm 31 is urged continuously in a direction toward the cams 16 and 18 by suitable spring means. Thus I have shown a leaf spring 37 which is bent about the pin 32 and is fastened by suitable means to bracket 27.

A suitable condenser 38 can be provided to minimize the arcing of contacts 34 and 35. One terminal of the condenser is grounded to body 10 and the other terminal is connected to the movable contact 34 by means of conductor 39 and spring 37.

The cam and breaker point assemblies can be protected by a suitable cover 41 which can be fastened to the body by suitable means such as screws 42.

Any suitable device such as a horn or flashing light can be used in connection with my device. For example, in Figure 2 a horn 46 is used which has one terminal connected to the positive side of a battery 47 and the other terminal connected to insulated movable contact 34. The body 10 and the contact 35 are grounded, together with the negative terminal of the battery. A circuit is energized and the horn 46 is sounded whenever contacts 34 and 35 are closed, and the circuit is deenergized whenever contacts 34 and 35 are open.

Operation of the device may be briefly described as follows: Let it be assumed that the shaft 12 is connected to the transmission of a vehicle in a satisfactory manner and also that it is connected in such a manner that when the vehicle is moving forwardly the shaft 12 is rotating in a clockwise direction (as viewed in Figures 1, 7 and 8) and when the vehicle is moving backwardly the shaft 12 is rotating in a counterclockwise direction. Let it also be assumed that the vehicle has been moving forwardly and that the cam assembly is in the position shown in Figure 8 (where the valley of cam 16 is angularly displaced 180° from the valley of cam 18) and that the vehicle is just ready to move backwardly.

Upon backward movement of the vehicle, shaft 12 immediately will move in a counter-clockwise direction carrying cam 16 and abutment member 21 in a counter-clockwise direction. Counter-clockwise movement of cam 18 will be retarded because of the frictional drag between block 36 and the periphery of cam 18. This retardation causes limiting shoulder on abutment member 21 to leave pin 25 on cam 18 and continued rotation of abutment member 21 causes limiting shoulder 24 to come against pin 25 and forces cam 18 to rotate with cam 16.

During this movement, member 21 and cam 16 must move through 180° relative to cam 18 which brings the valleys of cams 16 and 18 from the opposed positions shown in Figure 8 to the in registry position of Figure 7.

Thus the rubbing block 36 on contactor arm 31 is moved upwardly and downwardly as it moves in and out of the registered valleys of the cams 16 and 18. This in turn serves to make and break the contacts 34 and 35 periodically to intermittently sound the horn 46.

If the vehicle now moves forwardly the shaft 12 rotates in a clockwise direction and the abutment member 21 and cam 16 also rotate in a clockwise direction. Movement of cam 18 is retarded by the frictional drag of rubbing member 36, causing limiting shoulder 23 to come against pin 25 to force cam 18 to rotate in a clockwise direction with cam 16. During this movement, the cams 16 and 18 will have moved 180° relative to each other and the valleys will be in the opposed position shown in Figure 8.

The rubbing block 36 is of sufficient width to engage the peripheries of both of the cams 16 and 18, so it cannot under such conditions engage the valleys of either cam 16 or 18, as shown in Figure 8. Thus the contacts 34 and 35 will remain open, and the alarm will not be energized while the vehicle is moving forward.

It will be apparent from the foregoing that I have provided a simple device for intermittently operating warning equipment while the vehicle is moving backwardly. The device is reliable in operation and can be readily installed on various types of vehicles.

I claim:

1. In a back-up warning device adapted to be connected to a member of a vehicle which rotates in opposite directions upon forward or reverse movement of said vehicle, and which is adapted to operate intermittently an electrical alarm circuit upon reverse movement of said vehicle, said device comprising a body, a pair of relatively movable contacts mounted on said body and included in said circuit, a shaft journaled in said body and connected to said rotary member, a first cam fixed to said shaft, a second cam loosely mounted on said shaft, means forming a lost motion connection between the shaft and the second cam whereby the second cam is free to turn a limited angular distance relative to the first cam between two limiting positions, valleys formed on the peripheries of the cams, peripheries of said cams being free of abutments said valleys being substantially in registry for one limiting position and out of registry for another limiting position, and means frictionally engaging the peripheries of the cams for operating said contacts between open and closed positions, said last named means causing the second cam to remain substantially stationary relative to said first cam for a distance equal to said limited angular distance upon reversal of direction of rotation of said shaft.

2. In a back-up warning device adapted to be connected to a member of a vehicle which rotates continuously in opposite directions upon forward or reverse movement of said vehicle, and which is adapted to operate intermittently an electrical alarm circuit upon reverse movement of said vehicle, said device comprising a switch, a continuously rotatable shaft connected to said member, a cam member fixed to said shaft, a second cam member loosely mounted on said shaft, lost motion means connecting the cams whereby the second cam member can rotate between limiting positions relative to the first cam member, said cams having peripheral surfaces which conform to a cylinder free of abutments for said one limiting position and which form valley and land portions for said other limiting position, an operating member frictionally engaging the peripheral surfaces of both said first and second cam members and adapted to operate said switch, said operating member causing said second cam member to remain substantially stationary upon reversal rotation of said shaft to cause rotation of said second cam member relative to said first cam member between said limiting positions, said cam members serving, upon forward movement of said vehicle, to retain said switch in an open position, and serving upon rearward movement of said vehicle to intermittently open and close said switch.

3. A device as in claim 2 wherein both said cam members have valley and land portions adapted to be in registry upon rearward movement of said vehicle and out of registry upon forward movement of said vehicle.

4. In a back-up warning device adapted to be connected to a member of a vehicle and which rotates continuously in opposite directions upon forward or reverse movement of said vehicle, and which is adapted to operate intermittently an electrical alarm circuit upon reverse movement of said vehicle, said device comprising a switch, a continuously rotatable shaft connected to said member, a first cam member having valley and land portions and fixed to said shaft, a second cam member having valley and land portions and loosely mounted on said shaft, the land portions of said cam members conforming to segments of a cylinder that is free of abutments, an abutment member having a pair of angularly spaced shoulders thereon and fixed to said shaft, a projecting pin on said second cam member and adapted to engage either of said shoulders on said abutment member, said shoulders and said pin permitting said second cam member to rotate relative to said first cam member between two limiting positions, an operating member frictionally engaging said first and second cam members and adapted to operate said switch, said operating member causing said second cam member to remain substantially stationary upon reversal of rotation of said shaft until said pin engages one of said shoulders to cause movement of said second cam member relative to said first cam member from one limiting position to another, the valley portion of said cams being in registry in one position of said second cam member to cause reciprocating movement of said operating member to open and close said switch, and being out of registry in the other position of said second cam member to maintain said switch in an open position.

References Cited in the file of this patent

UNITED STATES PATENTS

| | | |
|---|---|---|
| 1,171,596 | Conrad et al. | Feb. 19, 1916 |
| 2,398,007 | Hunter | Apr. 9, 1946 |
| 2,427,453 | Hadley | Sept. 16, 1947 |
| 2,431,117 | Hadley | Nov. 18, 1947 |
| 2,580,677 | Hadley | Jan. 1, 1952 |
| 2,664,477 | Lewis et al. | Dec. 29, 1953 |